United States Patent
Frenger et al.

(10) Patent No.: US 9,036,571 B2
(45) Date of Patent: May 19, 2015

(54) METHOD AND ARRANGEMENT IN A RADIO COMMUNICATIONS SYSTEM FOR DYNAMIC CARRIER MODE SWITCHING

(75) Inventors: Pål Frenger, Linköping (SE); Robert Baldemair, Solna (SE); Erik Dahlman, Bromma (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 387 days.

(21) Appl. No.: 13/319,267

(22) PCT Filed: May 8, 2009

(86) PCT No.: PCT/SE2009/050504
§ 371 (c)(1),
(2), (4) Date: Nov. 7, 2011

(87) PCT Pub. No.: WO2010/128910
PCT Pub. Date: Nov. 11, 2010

(65) Prior Publication Data
US 2012/0122455 A1    May 17, 2012

(51) Int. Cl.
H04W 4/00    (2009.01)
H04W 88/06   (2009.01)
H04L 5/00    (2006.01)
H04W 76/04   (2009.01)

(52) U.S. Cl.
CPC ............. *H04W 88/06* (2013.01); *H04L 5/0037* (2013.01); *H04W 76/048* (2013.01)

(58) Field of Classification Search
CPC .... H04W 72/042; H04W 4/00; H04W 72/048
USPC .................. 455/436, 452.1; 370/329, 485
See application file for complete search history.

(56) References Cited

U.S. PATENT DOCUMENTS

2008/0095195 A1* 4/2008 Ahmadi et al. ............... 370/478
2009/0046632 A1* 2/2009 Nanda et al. .................. 370/328

OTHER PUBLICATIONS

3rd Generation Partnership Project. "Consideration on Carrier Aggregation for Home eNB." 3GPP TSG RAN WG1 meeting #56, R1-090817, Athens, Greece, Feb. 9-13, 2009.
3rd Generation Partnership Project. "Notion of a Carrier in LTE-A." 3GPP TSG RAN WG1 #56bis, R1-091458, Seoul, Korea, Mar. 23-27, 2009.
3rd Generation Partnership Project. "Refinement on Downlink Reference Signal Design." 3GPP TSG RAN WG1 #56bis, R1-091291, Seoul, Korea, Mar. 23-27, 2009.

(Continued)

*Primary Examiner* — Patrick Edouard
*Assistant Examiner* — Michael Irace
(74) *Attorney, Agent, or Firm* — Coats & Bennett, PLLC

(57) ABSTRACT

A method in a radio network node for dynamic carrier mode switching is provided. The radio network node is comprised in a radio communications system. The radio network node is configured to operate in a legacy mode and is further configured to operate in a non legacy mode. At least one carrier is operated so that it switches (602) from non legacy mode to legacy mode. When operating the carrier in the legacy mode, the radio network node signals (603) with a user equipment. The user equipment operates in legacy mode, but can not operate in non legacy mode. The radio network node then operates the at least one carrier so that it switches (604) from legacy mode back to non legacy mode.

24 Claims, 8 Drawing Sheets

(56) References Cited

OTHER PUBLICATIONS

3rd Generation Partnership Project. 3GPP TR 36.814, V0.4.1 (Feb. 2009). 3rd Generation Partnership Project; Technical Specification Group Radio Access Network; Further Advancements for E-UTRA Physical Layer Aspects (Release 9). Feb. 2009.

Tanno, M. et al. "Evolved UTRA—Physical Layer Overview." IEEE 8th Workshop on Signal Processing Advances in Wireless Communications (SPAWC 2007), Helsinki, Finland, Jun. 17-20, 2007.

Parkvall, S. et al. "LTE-Advanced—Evolving LTE Towards IMT-Advanced." IEEE 68th Vehicular Technology Conference (VTC 2008-Fall), Calgary, BC, CA, Sep. 21-24, 2008.

* cited by examiner

METHOD AND ARRANGEMENT IN A RADIO COMMUNICATIONS SYSTEM FOR DYNAMIC CARRIER MODE SWITCHING

TECHNICAL FIELD

The present invention relates to a method and an arrangement in a radio network node. In particular, it relates to increased energy efficiency by dynamic mode switching.

BACKGROUND

In a typical cellular system, also referred to as a radio communications system, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies.

Being "green" has quickly gone from just a marketing hype to a key requirement for customers. This is true today for almost all sectors in society and the telecom market is no exception. The world today is facing a global energy crisis as people start to realize that our carbon based economy is no longer sustainable. Two areas that will become significant parts of a future sustainable economy are energy savings and telecommunications. Energy savings are by far the quickest and cheapest way of reducing carbon dioxide emissions to the atmosphere and telecommunication can significantly reduce the need for physical transportation of people and services. In 3rd Generation Partnership Project (3GPP) the work on the first release of the 3G Long Term Evolution (LTE) system, denoted LTE Rel-8 in 3GPP jargon, was finalized during 2008. The specifications of the next releases (denoted LTE Rel-9 and LTE Rel-10) are expected to be available 2009 and 2010 respectively. In LTE Rel-8 the maximum bandwidth is 20 MHz while in Rel-10 support for aggregation of multiple component carriers resulting in a total bandwidth of up to 100 MHz is expected to be specified, which LTE Rel-8 system and later releases of the LTE system all consume power.

SUMMARY

It is therefore an objective of the present solution to provide a mechanism enabling better power saving base station operation.

According to a first aspect of the present invention, the object is achieved by a method in a radio network node for dynamic carrier mode switching. The radio network node is comprised in a radio communications system. The radio network node is configured to operate in a legacy mode and is further configured to operate in a non legacy mode.

At least one carrier is operated so that it switches from non legacy mode to legacy mode. When operating the carrier in the legacy mode, the radio network node signals with a user equipment in accordance to the format of the legacy mode. The user equipment operates in legacy mode, but can not operate in non legacy mode. The radio network node then operates the at least one carrier so that it switches from legacy mode back to non legacy mode.

According to a second aspect of the present invention, the object is achieved by an arrangement in a radio network node for dynamic carrier mode switching. The radio network node 110 is comprised in a radio communications system. The radio network node is configured to operate in a legacy mode and is further configured to operate in a non legacy mode. The radio network node arrangement comprises an operating unit configured to operate at least one carrier so that it switches from non legacy mode to legacy mode and to operate the at least one carrier so that it switches from legacy mode to non legacy mode.

The radio network node arrangement further comprises a signalling unit configured to signal with a user equipment in accordance to the legacy format, when operating the carrier in the legacy mode. The user equipment operates in legacy mode, but can not operate in non legacy mode.

In some embodiments, the radio network node may be a base station or a controller node such as a radio network controller or base station controller, connected to a base station. In some embodiments, the non legacy mode supports a service in a way that is non backwards compatible with the legacy mode. The service may be represented by base station DTX for power saving which is performed when operating the at least one carrier in the non legacy mode.

Since at least one carrier is switchable between a non-legacy mode e.g. enhanced to better enable base station DTX, and a legacy mode without this enhancement feature and since the radio network node signals with the legacy user equipment when the carrier is operated in legacy mode, it is possible for a legacy user equipment to continue to function in an upgraded network even after new enhanced and non-compatible functionality is introduced in a radio network node. This in turn implies that a mechanism is provided enabling better power saving base station operation such as DTX.

An advantage with the present invention is that power saving base station DTX can be performed when the radio network node is operating in non legacy mode.

The same switching mechanism may also be used to enable all other enhanced features of the non legacy mode, e.g. better support for advanced antennas and/or coordinated multipoint transmission and reception.

BRIEF DESCRIPTION OF THE DRAWINGS

The invention is described in more detail with reference to attached drawings illustrating exemplary embodiments of the invention and in which.

DETAILED DESCRIPTION

As part of the present solution a problem will firstly be defined and discussed. To introduce energy saving features, increased support for eNB Discontinuous Transmission (DTX) is required in LTE Rel-10. Several different types of downlink DTX could be considered. In the context of LTE 3 types of Down Link (DL) DTX modes could be defined: Short DTX could be defined as DTX that is fully backwards compatible with LTE Rel-8. Basically short DL DTX is then limited to one or a few OFDM symbols in which no cell specific reference symbols need to be transmitted. Medium DTX could be defined as DTX that is non backwards compatible with Rel-8, e.g. a DTX duration longer than one sub-frame (1 ms) but shorter than a radio frame (10 ms). Finally long DTX could be defined as a DTX duration that makes a carrier invisible also for Rel-10 UEs e.g. a DTX duration equal to one or several radio frames. The long DL DTX might also be denoted eNB sleep.

Figure 1:
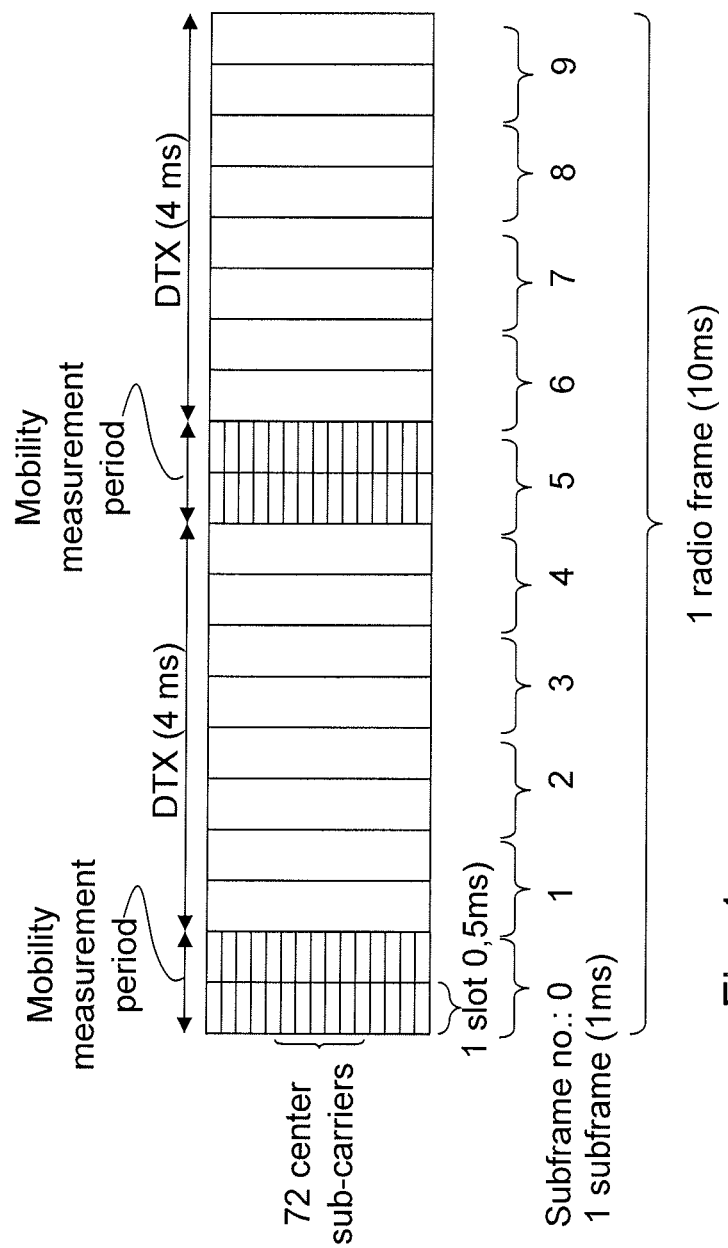
FIG. 1 is a schematic block diagram illustrating a radio frame according to prior art.

At a first glance it seems rather straightforward to introduce support for medium or long eNB DTX in LTE Rel-10. FIG. 1 shows a LTE radio frame with 72 center sub carriers, introducing eNB DTX for four ms in subframe no. 1, 2, 3, 4, 6, 7, 8 and 9. For example, the LTE Rel-10 specification may be slightly changed so that when there is little or no user plane data traffic, the eNB does not have to transmit Cell Specific Reference Symbols (CSRS) in every subframe. In this example, CSRS may only be mandatory in sub-frames 0 and 5 where also Primary Synchronization Signals (PSS) and Secondary Synchronization Signals (SSS) and Broadcast CHannel (BCH) are transmitted. CSRS also needs to be transmitted in those sub-frames that carry System Information Blocks, (SIBs). SIB1 is transmitted in the fifth sub-frame of every radio frame, SIBx where x>2 is configurable with very low duty cycle. In order for this to be allowed the UE behavior that the standard specifies may for example be changed so that UEs are only allowed to perform mobility measurements during sub-frames 0 and 5.

The fact that the CSRS are not transmitted in every sub-frame may also likely affect the Channel Quality Indicator (CQI) measurements. However already in Rel-8 it is possible to specify when in time the CQI measurements are to be performed. In Rel-8 the CQI measurements are performed 4 sub-frames before the UE are scheduled to report the CQI. No time domain filtering of CQI estimates are performed in the UE. It might be necessary to reconsider if this mechanism is sufficient also for Rel-10 or if some more flexibility is required.

In case UEs measure the CQI in sub-frames other than 0 and 5 then they can not assume that there is any frequency correlation since the eNB may not always transmit CSRS in all resource blocks. Alternatively the UEs could detect an "all zero CQI" measurement as an indication that the eNB does not need any CQI report from the UE.

UE channel estimation is also affected. A slight degradation in channel estimation accuracy is expected since UEs can not utilize time and frequency correlation between resource blocks (unless they are adjacent to subframe 0 or 5). This however is already the case for TDD, where one cannot do interpolation between all subframes as some subframes are UL subframes. Hence this is not a fundamental problem.

There are many alternatives to the solution outlined in FIG. 1.
1. UE mobility measurements can be limited to
    the centre 6 resource blocks; and/or
    a single antenna port (e.g. antenna port 0) and/or
    the PSS and SSS signals only; and/or
    subframe 0 only, i.e. not both sub-frame 0 and 5 as in FIG. 1.

It is also possible that a future non legacy LTE release (e.g. Rel-10) defines a new set of reference symbols for non backwards compatible extension carriers. Current discussions in 3GPP mention two new sets of reference symbols: demodulation reference symbols (DM-RS) and channel state information reference symbols (CSI-RS). If new reference symbols are defined (e.g. a new set of mobility measurement reference signals of the DM-RS or CSI RS mentioned above) then it is likely that UE mobility measurements are defined on a sub-set of the new reference symbols.

To enable DTX periods longer than 4 ms one could imagine that an eNB sleep mode is also defined for LTE Rel-9 or LTE Rel-10. Periodically a sleeping eNB could transmit all signals needed for UEs to measure and attach to the cell, i.e. PSS, SSS, BCH, SIB1, SIB2, CSRS during a short active period duration such as e.g. 50 ms. The active period is then followed by a much longer inactive period such as e.g. 450 ms where nothing is transmitted from the eNB. The active period can be compatible with LTE Rel-8 or a later release, e.g. LTE Rel-10.

The problem with the energy saving solutions discussed above is that legacy LTE Rel-8 UEs can not access a cell where these new energy saving features are enabled. The reason is that LTE Rel-8 UEs expects the base station to transmit certain signals and if not all these signals are included in the new non legacy format then the legacy UE will not work properly.

It is therefore a further objective of the present solution to provide the means required to enable power saving in the base station such as e.g. eNB operation based on DTX or sleep, while at the same time ensuring that it is possible for a legacy user equipment to be supported by the network.

Figure 2:
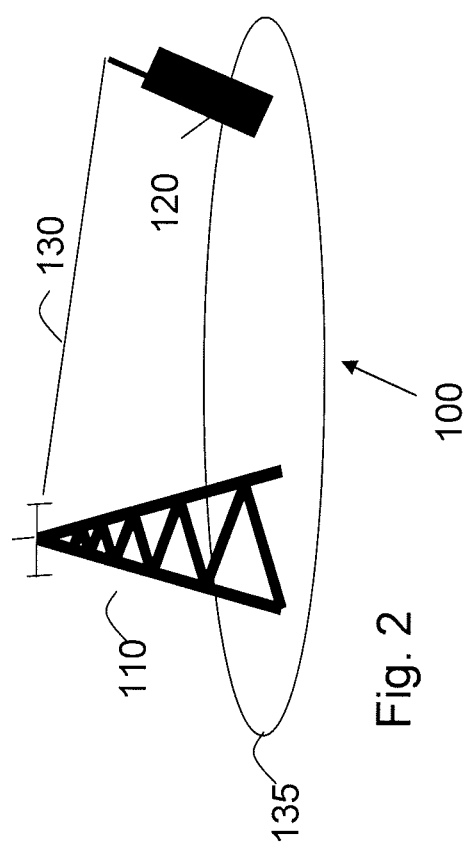
FIG. 2 is a schematic block diagram illustrating embodiments of a radio communications system.

FIG. 2 depicts a radio communications system 100, such as e.g. the E-UTRAN, also known as LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB). The radio communications system 100 supports different releases of a standardized radio specification such as a standardized LTE specification or a standardized High Speed Packet Access (HSPA) specification. The radio communications system 100 comprises a radio network node 110 and a user equipment 120 adapted to communicate with each other over a radio channel 130 comprising at least one carrier. The radio network node 110 serves a cell 135, and may be a base station such as a NodeB, an eNodeB or any other network unit capable to communicate with the user equipment 120, over the radio channel 130 when the user equipment is present within the cell 135 as shown in FIG. 2. The radio network node 110 may further be a radio network controller or base station controller adapted to be connected to a base station such as a NodeB, an eNodeB, or any other network unit capable to communicate with a terminal over the radio channel 130, not shown. The user equipment 120 may be a mobile phone, a Personal Digital Assistant (PDA), or any other network unit capable to communicate with a base station over a radio channel.

The radio network node 110 is configured to operate in a legacy mode. The legacy mode operation complies with a legacy release of a standardized radio specification, such as a standardized LTE specification, or a standardized High Speed Packet Access (HSPA) specification. The radio network node 110 is further configured to operate in a non legacy mode. The non legacy mode complies with a non legacy release of the standardized radio specification. The non legacy release of the standardized radio specification is a version released subsequent to the legacy release of the standardized radio specification. The non legacy mode supports a service such as e.g. base station DTX, extended support for multiple antennas (transmission and reception), coordinated multipoint transmission and reception, relay nodes with inband wireless self backhauling, enhanced broadcast services, etc. in a way that is non backwards compatible with the legacy mode.

The user equipment 120 operates in legacy mode, but can not operate in non legacy mode.

The basic concept of the present solution is to operate at least one carrier in the radio communications system 100 so that it dynamically switches between a legacy mode operation and non-legacy mode operation. The legacy mode operation complies with an early release of a standardized radio specifications such as the 3GPP LTE specifications e.g. Rel-8.

The non-legacy mode complies with a later release of the standardized radio specifications such as the 3GPP LTE specifications e.g. Rel-10, and may comprise enhanced support for eNB DTX or eNB sleep in a way that is non backwards compatible with the legacy mode.

Example of embodiments that will be described more in detail below:

In some embodiments a cell comprises several component carriers for which the radio network node 110 ensures that at least one component carrier is operating in a legacy mode. These embodiments will be described relating to FIG. 3.

In some embodiments a geographical area is covered by several cells (e.g. a macro cell and a micro cell) where the radio network node 110 ensures that at least one component carrier from one cell (typically the macro cell) is operating in a legacy mode. Legacy mode operation of a micro cell may be requested by an overlapping macro cell. These embodiments will be described relating to FIG. 4.

In some further embodiments a cell with a single component carrier continuously changes operation between a legacy mode and a non-legacy mode based e.g. on a predefined periodically or pseudo-randomly time pattern. These embodiments will be described relating to FIG. 5.

Figure 3:
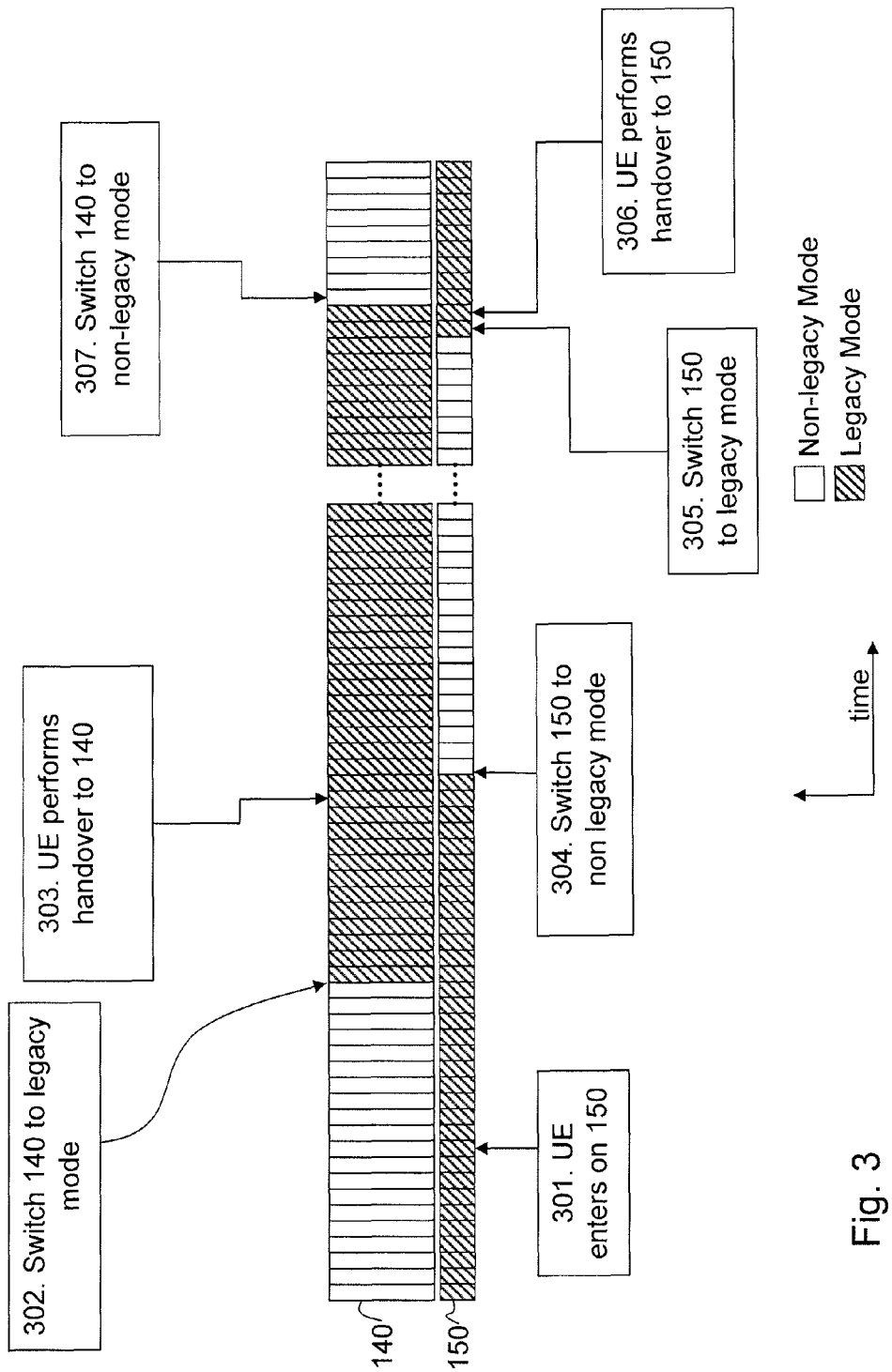
FIG. 3 is a combined schematic block diagram and flow-chart depicting embodiments of a method.

FIG. 3 is a combined schematic block diagram and flowchart depicting first embodiments of the present solution. In these embodiments the radio network node 110 uses multiple component carriers and ensures that at least one component carrier is always operating in a legacy mode. This is achieved by dynamically switching between a legacy mode operation and non-legacy mode operation on the component carriers. In FIG. 3, two component carriers are shown, one wide component carrier 140 which as an example may be 15 MHz, and one first component carrier 150 which as an example may be 5 MHz. The method may be performed by the following steps that may as well be carried out in another suitable order than described below.

Step 301

The wide component carrier 140 operates in non legacy mode that e.g. may be used for low energy DTX. The first component carrier 150 operates in legacy mode. The user equipment 120 that only operates in legacy mode enters on the first component carrier 150.

Step 302

The wide component carrier 140 that operates in non legacy mode switches to legacy mode that e.g. may be used for low energy DTX.

Step 303

The user equipment 120 that requires second performs handover to the wide component carrier 140 that now operates in legacy mode.

Step 304

The first component carrier 150 switches to non legacy mode. This step is optional. The reason for switching is that the new format may be better, e.g. from an energy efficiency point of view.

Step 305

The user equipment 120 does not require second any more. The first component carrier 150 that operates in non legacy mode switches to legacy mode.

Step 306

The user equipment 120 performs handover to the first component carrier 150 that now operates in legacy mode.

Step 307

The wide component carrier 140 that operates in legacy mode switches to non legacy mode that e.g. may be used for low energy DTX.

In some embodiments where the cell 135 is configured with a first component carrier and a second component carrier as in FIG. 3 one of the component carriers (e.g. the first band carrier) may be constantly configured to legacy mode. The first component carrier and the second component carrier may e.g. be a wide bandwidth component carrier and narrow bandwidth component carrier.

Figure 4:
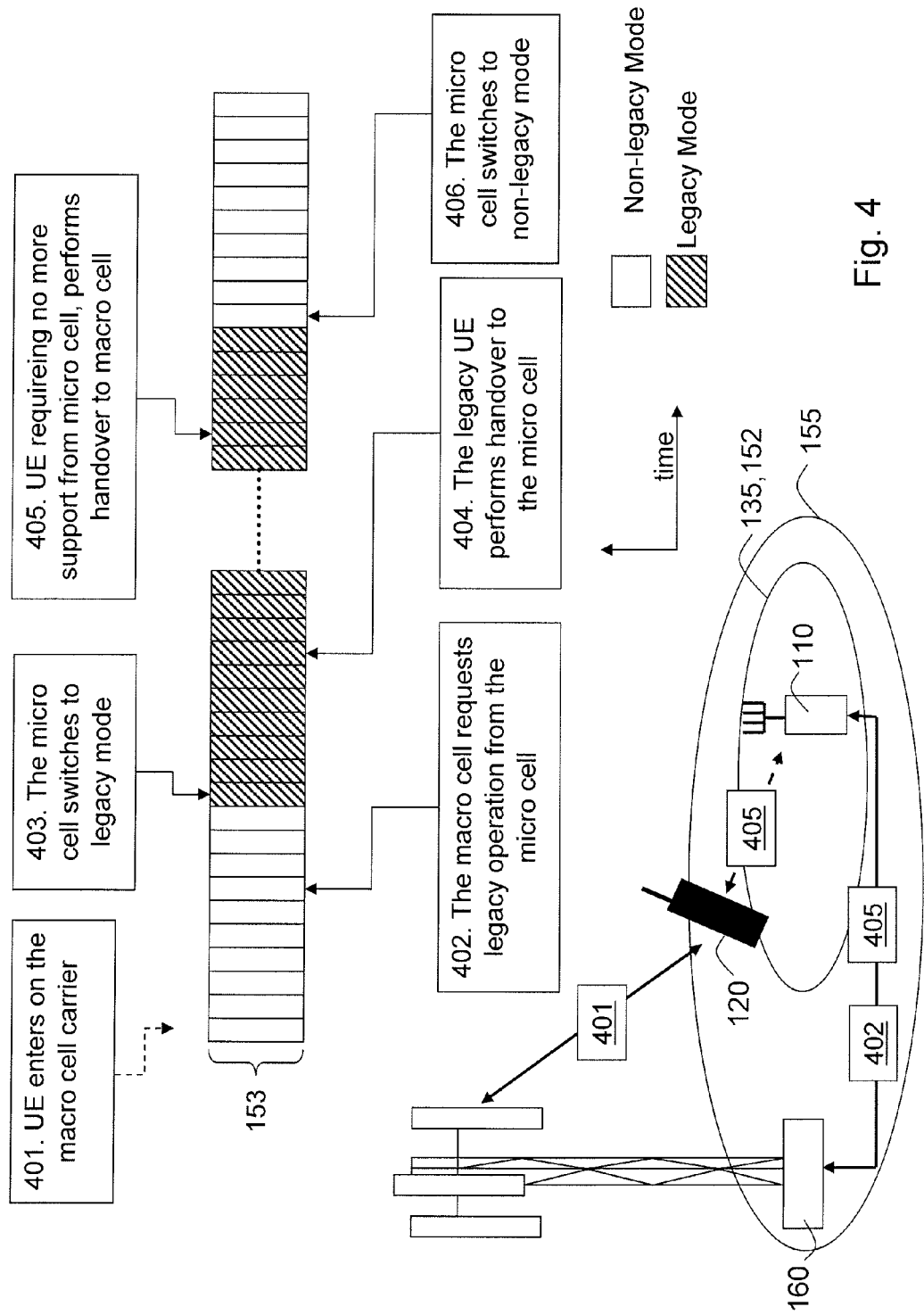
FIG. 4 is a combined schematic block diagram and flow-chart depicting embodiments of a method.

FIG. 4 is a combined schematic block diagram and flowchart depicting second embodiments of the present solution. In these embodiments the cell 135 is represented by a micro cell 152 which micro cell 135 is served by the radio network node 110. The radio network node uses a micro cell carrier 153. The micro cell 135 is covered by a macro cell 155 using a macro cell carrier not shown, which macro cell 155 is served by a second network node 160. The micro cell 152 is covered by the macro cell 155 like an umbrella. The radio network node 110 serving the micro cell 152, dynamically switches between a non-legacy mode e.g. being low energy consuming and a legacy mode based on a request from the second network node 160 serving the macro cell 155. The method may be performed by the following steps that may as well be carried out in another suitable order than described below. The steps 402 and 405 are optional.

Step 401

The micro cell carrier 153 operates in non legacy mode that e.g. may be used for low energy DTX. The macro cell carrier operates in legacy mode. The user equipment 120 that only operates in legacy mode enters the macro cell 155 on the macro cell carrier.

Step 402

The second network node 160 serving the macro cell 155, requests legacy operation from the radio network node 110 serving the micro cell 152.

Step 403

The micro cell carrier 153 that operates in non legacy mode switches to legacy mode.

Step 404

The user equipment 120 performs handover to the micro cell carrier 150 in the micro cell 152, now operating in legacy mode.

Step 405

The user equipment 120 performs handover to the macro cell carrier in the micro cell 155, operating in legacy mode. This may be performed when the user equipment 120 does not require support from the micro cell 152 any more. This step may also be performed when the micro cell wishes to throw out the user equipment 120 since it is no longer transmitting with a rate above a threshold value.

Step 406

The micro cell carrier 153 that operates in legacy mode switches back to non legacy mode that e.g. may be used for low energy DTX.

In some embodiments coverage cells typically need to be operating in a legacy mode while cells that only provides data rate increase where there is already coverage may be allowed to dynamically switch between a legacy mode and a non-backwards compatible non-legacy mode.

The switch between a legacy mode and non-legacy mode, e.g. with base station

DTX may be based on X2 communication between coverage cell and capacity cell as explained in steps 402 and 405 in FIG. 4. X2 is the name of the direct logical interface between neighboring base stations as defined in the LTE specifications by 3GPP.

Coverage cell can be another Radio Access Technology (RAT) cell, e.g. a micro LTE cell may rely on an umbrella GSM cell for notification of when legacy mode operation is required.

In one specific embodiment in the case of LTE, all cells, also umbrella cells, may run in a non Rel-8 compatible mode when the number of LTE Rel-8 user equipments is sufficiently low. Thus the present solution may only be required e.g. during 10 years or the like, in order to introduce the non-compatible feature into the system. But without the present solution such features can never be introduced.

Figure 5:
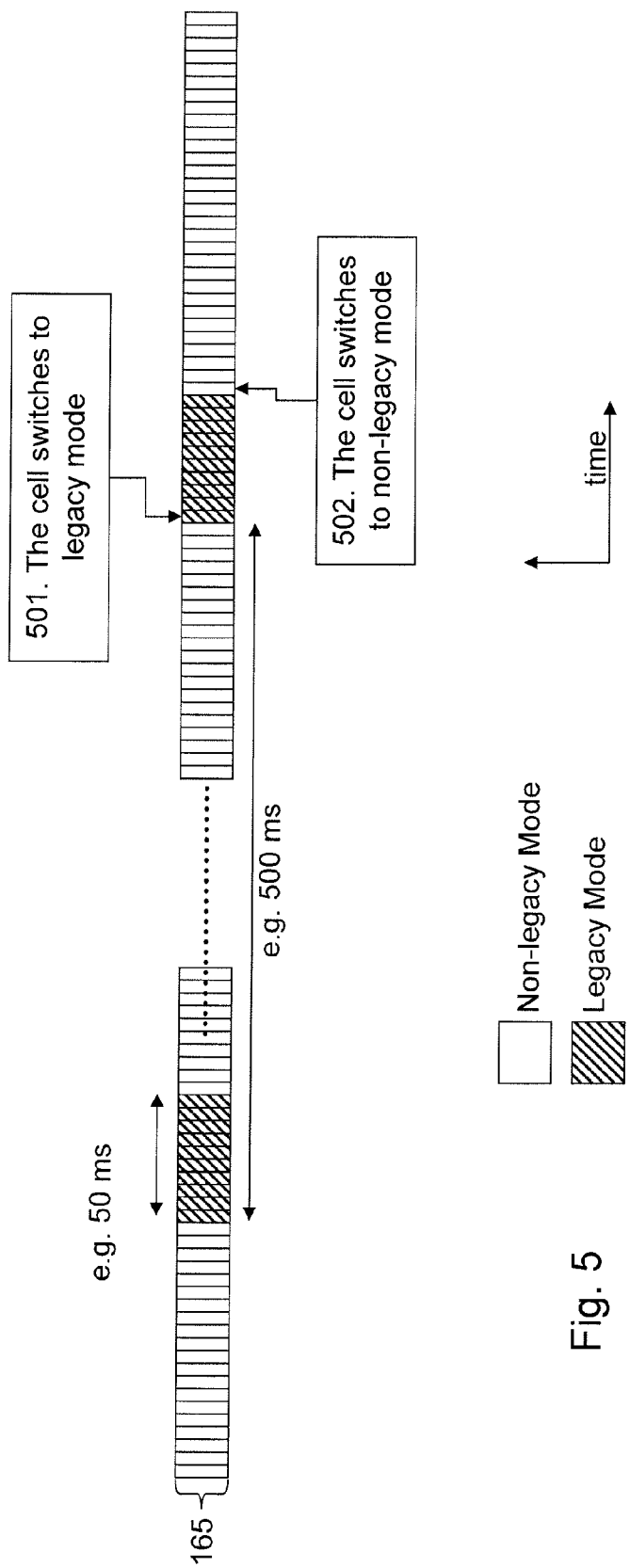
FIG. 5 is a combined schematic block diagram and flow-chart depicting embodiments of a method.

FIG. 5 is a combined schematic block diagram and flow-chart depicting third embodiments of the present solution. In these embodiments the radio network node 110 uses a carrier 165. The radio network node operates the carrier 165 to periodically or with a pseudo-random duration dynamically switch between a non legacy mode and a legacy mode. The method may be performed by the following steps that may as well be carried out in another suitable order than described below.

Step 501

The carrier 165 operates in non legacy mode. Periodically such as e.g. each 500 ms or in pseudo-random intervals, the radio network node 110 operates the carrier so that it switches to legacy mode.

Step 501

After a period in legacy mode, such as e.g. 50 ms, the radio network node 110 operates the carrier so that it switches back to non legacy mode.

By periodically or pseudo-randomly turning on legacy mode as depicted in FIG. 5 the legacy user equipment 120 and other legacy user equipments within reach of the cell 135 can find the cell 135. These third embodiments are particularly useful in a capacity cell covered by an umbrella cell as described above.

In some embodiments, one component carrier of the multiple component carriers is an anchor carrier. The anchor carrier is operated so that it is switched to non legacy mode for 1 ms every second and thereby most of the time is operated in legacy mode.

"Anchor carrier" is a term commonly used by 3GPP. It is used in the discussion regarding bandwidths larger than 20 MHz for LTE Rel-10. What is meant is that if an LTE Rel-10 system with e.g. 60 MHz bandwidth is required, this is achieved by aggregating three 20 MHz "component carriers". In case only one of the "component carriers" is backwards compatible with e.g. Rel-8 user equipments, then that carrier is called the "anchor carrier" and the other carriers are called "extension carriers".

The extension carriers may then be operated in non-legacy mode always or most of the time.

Figure 6:
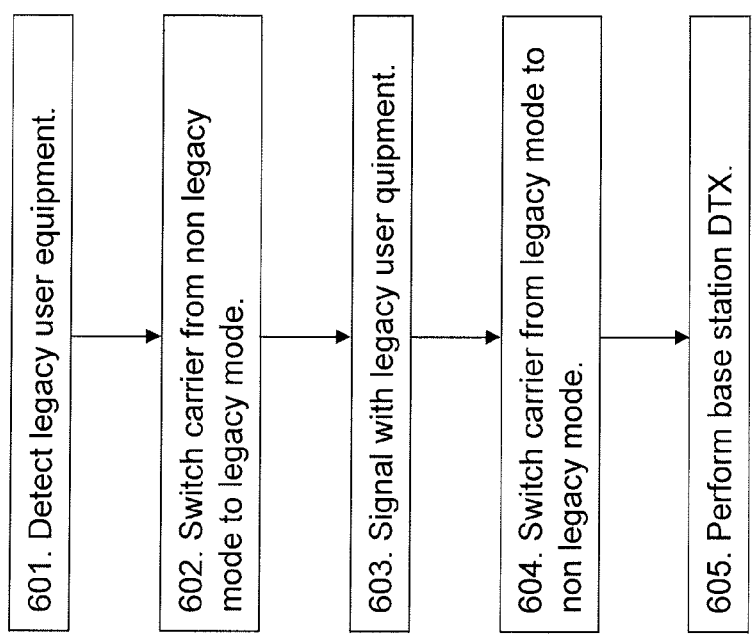
FIG. 6 is a flowchart depicting embodiments of a method in a radio network node.

The method steps in the radio network node 110 for dynamic carrier mode switching, according to some general embodiments will now be described with reference to a flow-chart depicted in FIG. 6. As mentioned above, the radio network node 110 is comprised in a radio communications system. The radio network node 110 is configured to operate in a legacy mode and is further configured to operate in a non legacy mode. The radio network node 110 may be a base station or a controller node such as a radio network controller or base station controller, connected to a base station. The non legacy mode may support the service in a way that is non backwards compatible with the legacy mode. The method comprising the following steps that may as well be carried out in another suitable order than described below:

Step 601

This is an optional step. The radio network node 110 operates the at least one carrier in the non legacy mode. The radio network node 110 may detect that the user equipment 120 operating in the legacy mode is present in a geographical area being served by the radio network node 110. This step may trigger the next step 602.

Step 602

The radio network node 110 operates at least one carrier so that it switches from non legacy mode to legacy mode. The switching of the at least one carrier from non legacy mode to legacy mode may be performed periodically or with pseudo-random intervals.

Step 603

In this step when the carrier operates in the legacy mode, the radio network node 110 signals with the user equipment 120 in accordance to the legacy format. The user equipment 120 operates in legacy mode, but can not operate in non legacy mode. The minimum signalling from the radio network node 110 may be the signals according to the legacy format, e.g. Primary Synchronization Sequences or Secondary Synchronization Sequences (PSS/SSS), CSRS, and Broadcast Channel (BCH) transmissions in case of LTE Rel-8.

Step 604

The radio network node 110 operates (604,711,808) the at least one carrier so that it switches from legacy mode to non legacy mode.

Step 605

This is an optional step. In some embodiments, the service is represented by base station DTX for power saving which is performed when operating the at least one carrier in the non legacy mode.

In some embodiments, the at least on carrier is represented by multiple component carriers. The above steps 602 and 604 may be performed such that at least one component carrier of the multiple component carriers always operate in legacy mode.

In some specific embodiments, one component carrier of the multiple component carriers may be an anchor carrier. In these embodiments the above steps 602 and 604 may be performed such that the anchor carrier operate in legacy mode and is switched to non legacy mode for 1 ms every second.

Figure 7:
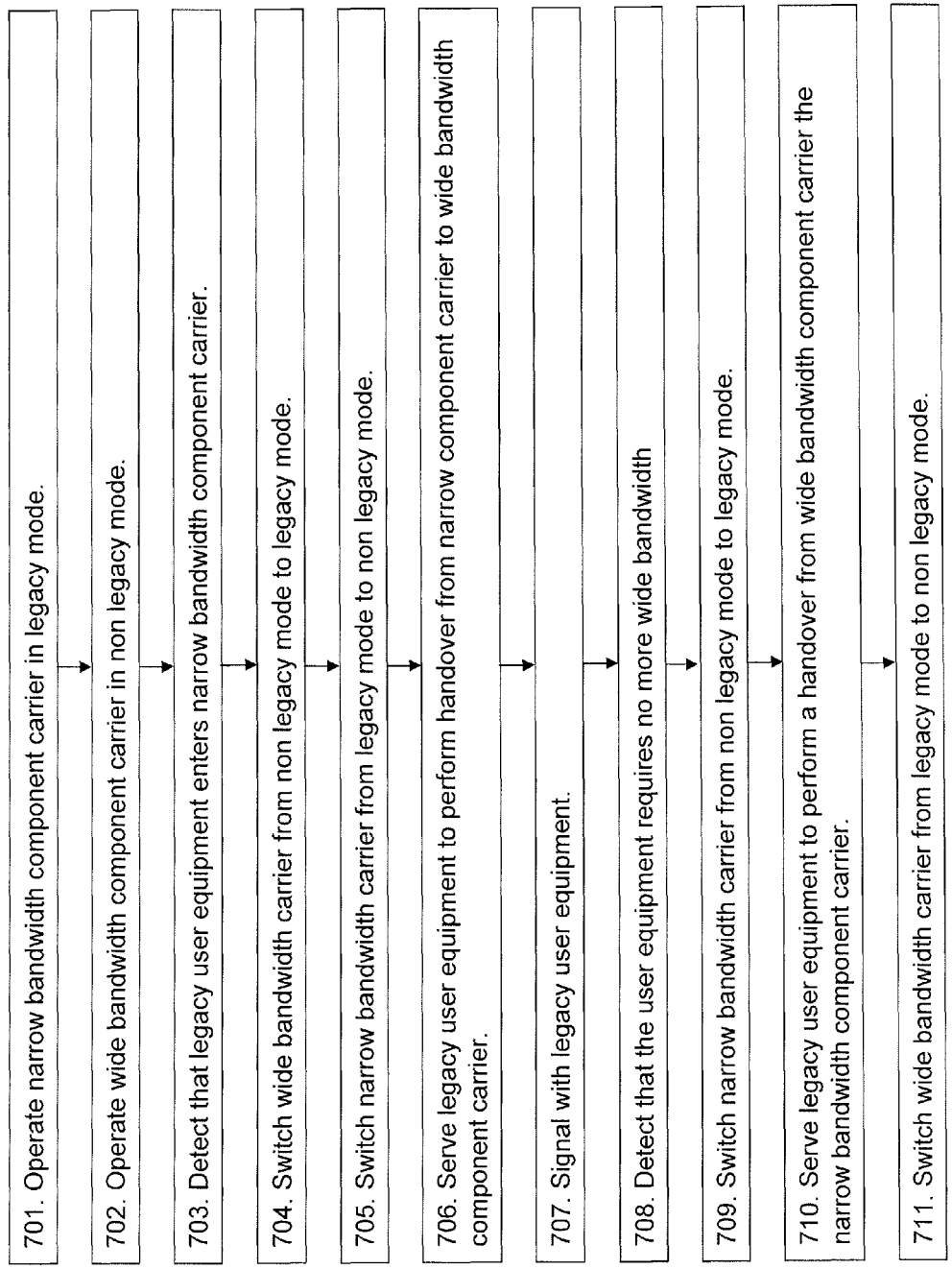
FIG. 7 is a flowchart depicting embodiments of a method in a radio network node.

The method steps in the radio network node 110 for dynamic carrier mode switching, according to some first embodiments will now be described with reference to a flow-chart depicted in FIG. 7. These first embodiments are embodiments of the general embodiments referred to above, and relates to the first embodiments described above with reference to FIG. 3. Therefore all the steps 701-711 can be seen as optional steps. In these first embodiments, the radio network node 110 uses multiple component carriers comprising a first bandwidth component carrier and a second component carrier. The first component carrier and the second component carrier may e.g. be a wide bandwidth component carrier and narrow bandwidth component carrier. According to some embodiments, the multiple component carriers comprises several component carriers, all of the same bandwidth, which may be switched from one component carrier in legacy mode to all component carriers in legacy mode.

As mentioned above, the radio network node 110 is comprised in a radio communications system. The radio network node 110 is configured to operate in a legacy mode and is further configured to operate in a non legacy mode. The radio network node 110 may be a base station or a controller node such as a radio network controller or base station controller, connected to a base station. The non legacy mode may support the service in a way that is non backwards compatible with the legacy mode. The method comprising the following steps that may as well be carried out in another suitable order than described below:

Step 701

The radio network node 110 operates the first bandwidth component carrier in legacy mode.

Step 702

The radio network node 110 operates the second component carrier in non legacy mode.

Step 703

The radio network node 110 detects that the user equipment 120 enters the first bandwidth component carrier operating in legacy mode. The user equipment 120 operates in legacy mode, but can not operate in non legacy mode.

Step 704

In these first embodiments this step of operating at least one carrier so that it switches from non legacy mode to legacy mode which step corresponds to step 602, is performed by operating the second component carrier such that it switches to legacy mode.

Step 705

This is an optional step. The radio network node 110 operates the first bandwidth component carrier such that it switches to a non legacy mode.

Step 706

The radio network node 110 then serves the user equipment 120 such that it performs a handover from the first component carrier to the second component carrier operating in legacy mode.

Step 707

In this step when the carrier operates in the legacy mode, the radio network node 110 signals with the user equipment 120 in accordance to the legacy format. This step corresponds to step 603.

Step 708

The radio network node 110 detects that the user equipment 120 requires not using the second component carrier any more. This may e.g. be performed by the radio network node 110 detecting that the length of the data buffers corresponding to the user equipment 120 have stayed below a threshold for given duration of time.

Step 709

The radio network node 110 operates the first bandwidth component carrier such that it switches to a legacy mode.

Step 710

The radio network node 110 then serves the user equipment 120 such that it performs a handover from the second component carrier to the first bandwidth component carrier.

Step 711

In these first embodiments this step of operating the at least one carrier so that it switches from legacy mode to non legacy mode which step corresponds to step 604, is performed by operating the second component carrier such that it switches to the non legacy mode.

Also in these first embodiments, the service may be represented by base station DTX for power saving which may be performed when operating the second component carrier and for first bandwidth component carrier in the non legacy mode.

Figure 8:
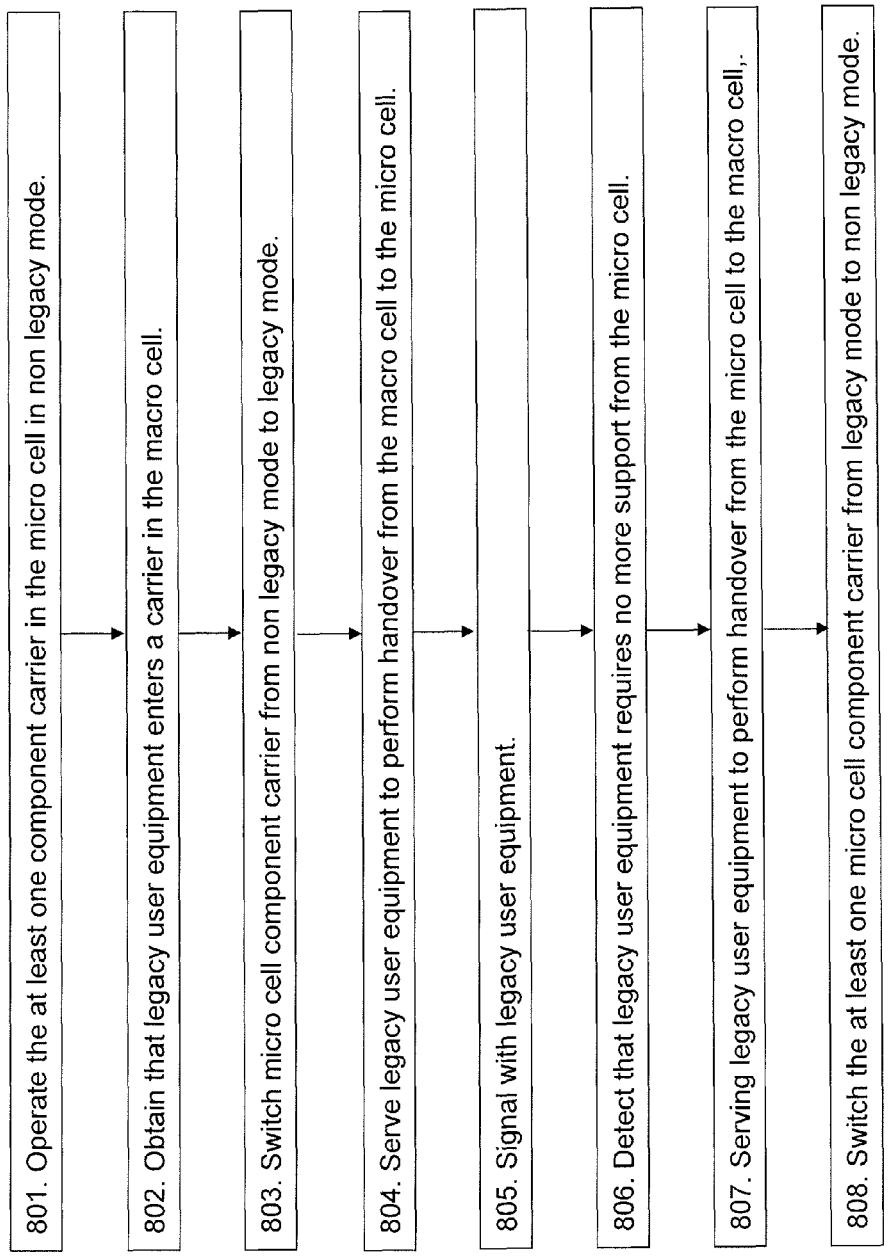
FIG. 8 is a flowchart depicting embodiments of a method in a radio network node.

The method steps in the radio network node 110 for dynamic carrier mode switching, according to some second embodiments will now be described with reference to a flow-chart depicted in FIG. 8. These second embodiments are embodiments of the general embodiments referred to above, and relate to the second embodiments described above with reference to FIG. 4. Therefore all the steps 801-808 can be seen as optional steps. In these second embodiments, the radio network node 110 serves a micro cell 152, which micro cell 152 is covered by a macro cell 155. As mentioned above, the radio network node 110 is comprised in a radio communications system. The radio network node 110 is configured to operate in a legacy mode and is further configured to operate in a non legacy mode. The radio network node 110 may be a base station or a controller node such as a radio network controller or base station controller, connected to a base station. The non legacy mode may support the service in a way that is non backwards compatible with the legacy mode. The method comprising the following steps that may as well be carried out in another suitable order than described below:

Step 801

The radio network node 110 operates the at least one component carrier in the micro cell 152 in non legacy mode.

Step 802

The radio network node 110 may obtain information or detect that the user equipment 120 enters a carrier in the macro cell 155. The user equipment 120 operates in legacy mode, but can not operate in non legacy mode. This step may be performed by receiving a request from the second network node 160 serving the macro cell 155. The request requests legacy operation from the micro cell 152.

Step 803

In these second embodiments, this step of operating at least one carrier so that it switches from non legacy mode to legacy mode corresponding to step 602, is performed by operating the at least one component carrier in the micro cell so that it switches from non legacy mode to legacy mode.

The switching from non legacy mode to legacy mode may be performed periodically or with pseudo-random intervals.

Step 804

The radio network node 110 serves the user equipment 120 such that it performs a handover from the macro cell 155 to the micro cell 152, which micro cell 152 was switched to legacy mode.

Step 805

In this step when the micro cell carrier 153 operates in the legacy mode, the radio network node 110 signals with the user equipment 120 in accordance to the legacy format. This step corresponds to step 603.

Step 806

The radio network node 110 detects that the user equipment 120 requires no more support from the micro cell. This may e.g. be performed by the radio network node 110 controlling the micro cell 152 and detecting that the data buffers corresponding to the user equipment 120 are empty or almost empty most of the time.

Step 807

The radio network node 110 then serves the user equipment 120 such that it performs a handover from the micro cell 152 to the macro cell 155, Step 808

In these second embodiments, this step of operating the at least one carrier so that it switches from legacy mode to non legacy mode corresponding to step 604, is performed by operating the at least one component carrier in the micro cell such that it switches from the legacy mode to the non legacy mode.

Also in these second embodiments, the service may be represented by base station DTX for power saving which may be performed when operating the micro cell carrier in non legacy mode.

According to some third embodiments referred to above with reference to FIG. 5, by periodically or pseudo-randomly switching the micro cell carrier 153 from non legacy mode to legacy mode, the legacy user equipment 120 and other legacy user equipments within reach of the cell 135 can find the cell 135. These third embodiments are particularly useful in a capacity cell covered by an umbrella cell as described above.

Figure 9:
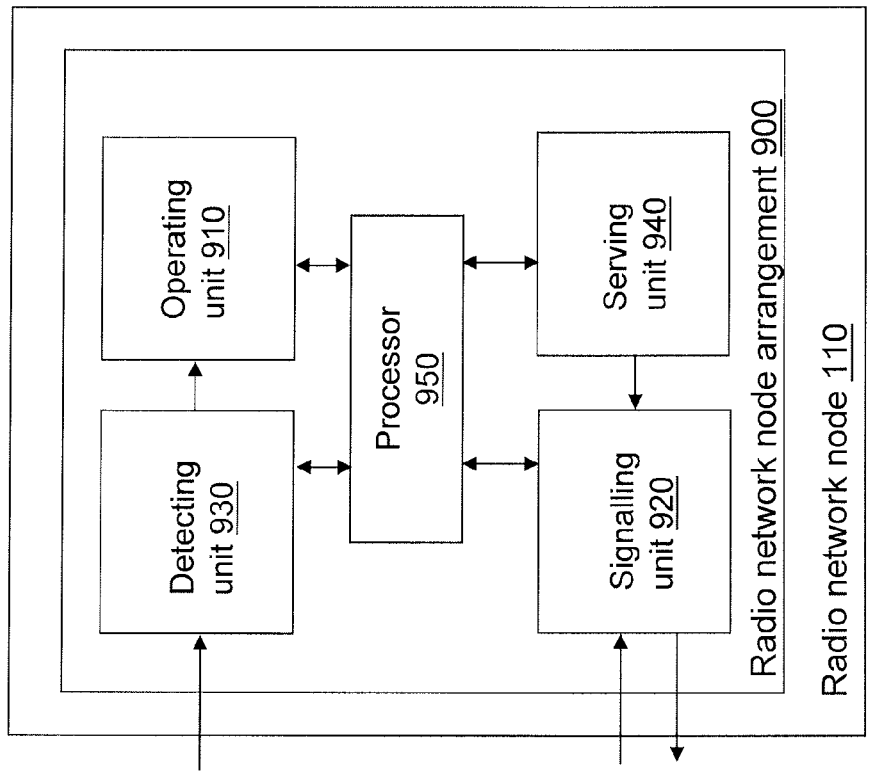
FIG. 9 is a schematic block diagram illustrating embodiments of a radio network node arrangement.

To perform the method steps above for dynamic carrier mode switching, the radio network node 110 comprises an arrangement 900 depicted in FIG. 9. As mentioned above, the radio network node 110 is comprised in a radio communications system. The radio network node 110 is configured to operate in a legacy mode and is further configured to operate in a non legacy mode.

In some embodiments, the radio network node 110 is a base station or a controller node such as e.g. a radio network controller or base station controller, which controller node is connected to a base station.

The radio network node arrangement 900 comprises an operating unit 910 configured to operate at least one carrier so that it switches from non legacy mode to legacy mode.

In some embodiments the non legacy mode supports a service in a way that is non backwards compatible with the legacy mode. The service may comprise base station DTX for power saving, that may be performed by the operating unit 910 when the at least one carrier is operated in the non legacy mode.

The operating unit 910 is further configured to operate the at least one carrier so that it switches from legacy mode to non legacy mode.

The switching of the at least one carrier from non legacy mode to legacy mode may be performed periodically or in pseudo-random intervals.

The radio network node arrangement 900 further comprises a signalling unit 920 configured to signal with the user equipment 120 in accordance to the legacy format, when operating the carrier in the legacy mode. The user equipment 120 operates in legacy mode, but can not operate in non legacy mode.

The radio network node arrangement 900 may further comprise a detecting unit 930 configured to detect that the user equipment 120, operating in the legacy mode, is present in a geographical area being served by the radio network node 110, when operating the at least one carrier in the non legacy mode. The detection may be a trigger for the operating unit 910 to operate the at least one carrier so that it switches from non legacy mode to legacy mode upon.

In some embodiments, the at least on carrier is represented by multiple component carriers, and wherein the operating unit 910 further is configured to operate the multiple component carriers so that at least one of them switches from non legacy mode to legacy mode, and to operate each of the multiple component carriers so that at least one of them switches from legacy mode to non legacy mode, such that the anchor carrier operates in legacy mode and is switched to non legacy mode for 1 ms every second.

In some other embodiments, the at least on carrier is represented by multiple component carriers. In these embodiments, the operating unit 910 may further be configured to operate the multiple component carriers so that at least one of them switches from non legacy mode to legacy mode, and to operate each of the multiple component carriers so that at least one of them switches from legacy mode to non legacy mode, such that at least one component carrier of the multiple component carriers always operate in legacy mode.

In some embodiments the multiple component carriers comprise a first bandwidth component carrier and a second component carrier, such as e.g. a wide bandwidth component carrier and narrow bandwidth component carrier.

In these embodiments, the operating unit 910 further is configured to operate the first bandwidth component carrier in legacy mode and to operate the second component carrier in non legacy mode. In these embodiments, the detecting unit 930 may further be configured to detect that the user equipment 120 enters the first bandwidth component carrier, which first bandwidth component carrier operates in legacy mode. In these embodiments, the operating unit 910 may further is configured to perform the operation of at least one carrier so that it switches from non legacy mode to legacy mode, by operate the second component carrier such that it switches to a legacy mode.

The radio network node arrangement 900 may further comprising a serving unit 940 configured to serve the user equipment 120 such that it performs a handover from the first component carrier to the second component carrier, which second component carrier has been switched to legacy mode. The serving unit 940 may further be configured to serve the user equipment 120 such that it performs a handover from the second component carrier to the first bandwidth component carrier The operating unit 910 may further be configured to operate the first bandwidth component carrier such that it switches to a non legacy mode, after serving the user equipment 120 to perform handover.

The detecting unit 930 may further be configured to detect that the user equipment 120 requires no more of second. The operating unit 910 may further be configured to operate the first bandwidth component carrier such that it switches to a legacy mode.

The operating unit 910 may further be configured to operate the second component carrier such that it switches to the non legacy mode.

In some embodiments, the radio network node 110 serves a micro cell 152, which micro cell 152 is covered by a macro cell 155.

In these embodiments, the operating unit 910 may further be configured to operate the at least one component carrier in the micro cell 152 in non legacy mode, and configured to operate the at least one component carrier in the micro cell so that it switches from non legacy mode to legacy mode. The operating unit 910 may further be configured to operate the at least one component carrier in the micro cell such that it switches from the legacy mode to the non legacy mode.

The detecting unit 930 may further be configured to obtain information or detect that the user equipment 120 enters a carrier in the macro cell 155. The detecting unit 930 may further be configured to obtain said information that the user equipment 120 enters a carrier in the macro cell 155 by receiving a request from a second network node 160 serving the macro cell 155. The request requests legacy operation from the micro cell 135. The detecting unit 930 may further be configured to detect that the user equipment 120 requires no more support from the micro cell.

The serving unit 940 may further be configured to serve the user equipment 120 such that it performs a handover from the macro cell 155 to the micro cell 152, which micro cell 152 has been switched to legacy mode. The serving unit 940 may further be configured to serve the user equipment 120 such that it performs a handover from the micro cell 152 to the macro cell 155.

The present mechanism for above for dynamic carrier mode switching, may be implemented through one or more processors, such as a processor 950 in the radio network arrangement 900 depicted in FIG. 9, together with computer program code for performing the functions of the present solution. The program code mentioned above may also be provided as a computer program product, for instance in the form of a data carrier carrying computer program code for performing the present solution when being loaded into the radio network node 110. One such carrier may be in the form of a CD ROM disc. It is however feasible with other data carriers such as a memory stick. The computer program code can furthermore be provided as pure program code on a server and downloaded to the radio network node 110 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a radio network node for dynamic carrier mode switching, the radio network node being included in a radio communications system and being configured to operate in a legacy mode and also being configured to operate in a non-legacy mode, said non-legacy mode supporting a service in a way that is not backwards compatible with the legacy mode, the method comprising:
    operating at least one carrier to switch between the non-legacy mode and the legacy mode;
    when operating the at least one carrier in the legacy mode, signaling with a user equipment only operable in the legacy mode via the at least one carrier in accordance with a legacy format corresponding to the legacy mode, the signaling including transmitting reference signals needed by the user equipment to perform Channel Quality Indicator (CQI) measurements; and
    when operating the at least one carrier in the non-legacy mode, performing discontinuous transmission for power saving;
    wherein operating the at least one carrier to switch between the non-legacy mode and the legacy mode comprises operating the at least one carrier in the legacy mode during transmission times at which the user equipment only operable in the legacy mode is expecting the reference signals.

2. The method of claim 1, wherein said operating at least one carrier to switch between the non-legacy mode and the legacy mode comprises periodically switching the at least one carrier from the non-legacy mode to the legacy mode.

3. The method of claim 1, wherein said operating at least one carrier to switch between the non-legacy mode and the legacy mode comprises switching the at least one carrier from the non-legacy mode to the legacy mode at pseudo-random intervals.

4. The method of claim 1, further comprising:
    while operating the at least one carrier in the non-legacy mode, detecting that the user equipment operating in the legacy mode is present in a geographical area being served by the radio network node; and
    wherein said detecting serves as a trigger causing the network node to switch the at least one carrier from the non-legacy mode to the legacy mode.

5. The method of claim 1, wherein the at least one carrier includes multiple component carriers, at least one of which is always operated in the legacy mode.

6. The method of claim 5, wherein one of the multiple component carriers is an anchor carrier that operates in the legacy mode and is switched to the non-legacy mode for 1 ms every second.

7. The method of claim 5, wherein the multiple component carriers include a first component carrier and a second component carrier, the method further comprising:
    operating the first component carrier in the legacy mode;
    operating the second component carrier in the non-legacy mode;
    detecting that the user equipment has entered a cell and is using the first component carrier operating in the legacy mode in the cell;
    switching the second component carrier to the legacy mode responsive to said detecting; and
    serving the user equipment to effect a handover of the user equipment from the first component carrier to the second component carrier operating in the legacy mode.

8. The method of claim 7, further comprising:
    switching the first component carrier to the non-legacy mode responsive to the handover of the user equipment from the first component carrier to the second component carrier.

9. The method of claim 7, further comprising:
  detecting, after the handover of the user equipment from the first component carrier to the second component carrier, that the user equipment no longer requires the second component carrier;
  switching the first component carrier to the legacy mode responsive to the detection that the user equipment no longer requires the second component carrier; and
  serving the user equipment to effect handover of the user equipment from the second component carrier to the first component carrier operating in the legacy mode;
  wherein operating at least one carrier to switch between the non-legacy mode and the legacy mode includes switching the second component carrier to the non-legacy mode.

10. The method of claim 1, wherein the radio network node serves a micro cell within a macro cell, the method further comprising:
  operating the at least one component carrier in the micro cell in the non-legacy mode;
  detecting that the user equipment has entered the macro cell;
  switching the at least one component carrier in the micro cell from the non-legacy mode to the legacy mode; and
  serving the user equipment to effect handover of the user equipment from the macro cell to the micro cell operating in the legacy mode.

11. The method of claim 10, wherein detecting that the user equipment has entered the macro cell comprises:
  receiving a request from a second network node serving the macro cell that requests legacy operation from the micro cell.

12. The method of claim 10, further comprising:
  detecting, after the handover of the user equipment from the macro cell to the micro cell, that the user equipment no longer requires support from the micro cell; and
  serving the user equipment to effect a handover of the user equipment from the micro cell to the macro cell responsive to the detection that the user equipment no longer requires support from the micro cell;
  wherein operating at least one carrier to switch between the non-legacy mode and the legacy mode includes switching the at least one component carrier in the micro cell from the legacy mode to the non-legacy mode.

13. A radio network node for dynamic carrier mode switching, the radio network node being included in a radio communications system, being configured to operate in a legacy mode, and being configured to operate in a non-legacy mode, said non-legacy mode supporting a service in a way that is not backwards compatible with the legacy mode, the radio network node comprising one or more processing circuits configured as:
  an operating unit configured to cause at least one carrier to switch between the non-legacy mode and the legacy mode; and
  a signaling unit configured to signal with a user equipment only operable in the legacy mode in accordance with a legacy format corresponding to the legacy mode when the at least one carrier is operated in the legacy mode, including transmission of reference signals needed by the user equipment to perform Channel Quality Indicator (CQI) measurements;
  wherein the operating unit is further configured to perform discontinuous transmission for power saving when operating the at least one carrier in the non-legacy mode; and
  wherein the operating unit is configured to cause the at least one carrier to operate in the legacy mode during transmission times at which the user equipment only operable in the legacy mode is expecting the reference signals.

14. The radio network node of claim 13, wherein the operating unit is further configured to cause the at least one carrier to switch from the non-legacy mode to the legacy mode periodically.

15. The radio network node of claim 13, wherein the operating unit is further configured to cause the at least one carrier to switch from the non-legacy mode to the legacy mode at pseudo-random intervals.

16. The radio network node of claim 13, wherein the one or more processing circuits are further configured as:
  a detecting unit configured to detect, while the at least one carrier is operating in the non-legacy mode, that the user equipment operating in the legacy mode is present in a geographical area being served by the radio network node, with the detection being a trigger causing the operating unit to cause the at least one carrier to switch from the non-legacy mode to the legacy mode.

17. The radio network node of claim 13, wherein the at least one carrier includes multiple component carriers, at least one of which always operates in the legacy mode.

18. The radio network node of claim 13, wherein the at least one carrier includes multiple component carriers, and wherein one of the multiple component carriers is an anchor carrier that operates in the legacy mode and is switched to the non-legacy mode for 1 ms every second.

19. The radio network node of claim 17, further comprising:
  wherein the multiple component carriers include a first component carrier and a second component carrier;
  wherein the operating unit is further configured to cause the first component carrier to operate in the legacy mode, and to cause the second component carrier to operate in the non-legacy mode;
  wherein the detecting unit is further configured to detect that the user equipment is using the first component carrier operating in the legacy mode;
  wherein the operating unit is further configured to cause the at least one carrier to switch from the non-legacy mode to the legacy mode responsive to said detection that the user equipment is using the first component carrier operating in the legacy mode; and
  wherein the one or more processing circuits are further configured as a serving unit configured to serve the user equipment to effect a handover of the user equipment from the first component carrier to the second component carrier, when the second component carrier has been switched to the legacy mode.

20. The radio network node of claim 19, wherein the operating unit is further configured to cause the first component carrier to switch to the non-legacy mode after the handover of the user equipment from the first component carrier to the second component carrier.

21. The radio network node of claim 19, further comprising:
  wherein the detecting unit is further configured to detect that the user equipment no longer requires the second component carrier;
  wherein the operating unit is further configured to cause the first component carrier to switch to the legacy mode responsive to said detection that the user equipment no longer requires the second component carrier;
  wherein the serving unit is further configured to effect a handover of the user equipment from the second component carrier to the first component carrier responsive to the switching of the first component carrier to the legacy mode; and wherein the operating unit is further configured to cause the second component carrier to switch to the non-legacy mode responsive to the handover of the user equipment from the second component carrier to the first component carrier.

22. The radio network node of claim 13, wherein the radio network node serves a micro cell within a macro cell, the radio network node further comprising:

wherein the operating unit is further configured to cause the at least one component carrier in the micro cell to operate in the non-legacy mode;

wherein the detecting unit is further configured to detect that the user equipment has entered the macro cell;

wherein the operating unit is further configured to cause the at least one component carrier in the micro cell to switch from the non-legacy mode to the legacy mode responsive to said detection; and wherein the serving unit is further configured to effect a handover of the user equipment from the macro cell to the micro cell, with the micro cell having been switched to the legacy mode.

23. The radio network node of claim 22, wherein the detecting unit is further configured to detect that the user equipment has entered the macro cell by receiving a request from a second network node serving the macro cell that requests legacy operation from the micro cell.

24. The radio network node of claim 22, further comprising:

wherein the detecting unit is further configured to detect that the user equipment no longer requires support from the micro cell;

wherein the serving unit is further configured to effect a handover of the user equipment from the micro cell to the macro cell responsive to the detection that the user equipment no longer requires support from the micro cell; and wherein the operating unit is further configured to cause the at least one component carrier in the micro cell to switch from the legacy mode to the non-legacy mode responsive to the handover of the user equipment from the micro cell to the macro cell.

\* \* \* \* \*

UNITED STATES PATENT AND TRADEMARK OFFICE
CERTIFICATE OF CORRECTION

| | | |
|---|---|---|
| PATENT NO. | : 9,036,571 B2 | Page 1 of 1 |
| APPLICATION NO. | : 13/319267 | |
| DATED | : May 19, 2015 | |
| INVENTOR(S) | : Frenger et al. | |

It is certified that error appears in the above-identified patent and that said Letters Patent is hereby corrected as shown below:

Specification

In Column 3, Line 58, delete "where" and insert -- were --, therefor.

In Column 7, Line 24, delete "cell 155," and insert -- cell 152, --, therefor.

In Column 10, Lines 37-38, delete "and for" and insert -- and/or --, therefor.

In Column 11, Line 32, delete "cell 155," and insert -- cell 155. --, therefor.

Signed and Sealed this
Eighth Day of March, 2016

Michelle K. Lee
*Director of the United States Patent and Trademark Office*